United States Patent [19]

Ruckenstein et al.

[11] Patent Number: 5,061,767

[45] Date of Patent: Oct. 29, 1991

[54] HYDROPHILIC-HYDROPHOBIC POLYMER COMPOSITES AND MEMBRANES

[75] Inventors: Eli Ruckenstein, Amherst; Jun S. Park, Snyder, both of N.Y.

[73] Assignee: State University of New York, Albany, N.Y.

[21] Appl. No.: 505,769

[22] Filed: Apr. 5, 1990

Related U.S. Application Data

[63] Continuation of Ser. No. 253,979, Oct. 5, 1990, abandoned.

[51] Int. Cl.$^5$ ............................ C08F 2/04; C08F 2/32; C08F 4/28; C08F 20/54
[52] U.S. Cl. .................................. 526/219.2; 526/207; 526/227; 526/303.1; 526/307.8; 525/227; 525/183
[58] Field of Search ...................... 526/207, 303.1, 227, 526/307.8, 219.2

[56] References Cited

U.S. PATENT DOCUMENTS

| | | | |
|---|---|---|---|
| 3,931,128 | 1/1976 | Takizawa et al. | 526/219.2 |
| 4,739,008 | 4/1988 | Robinson et al. | 526/264 |

*Primary Examiner*—John C. Bleutge
*Assistant Examiner*—Steven Kumiega
*Attorney, Agent, or Firm*—James F. Mudd; Ellen K. Park; Michael L. Dunn

[57] ABSTRACT

A polymer composite, a method of making a polymer composite and a polymer composite membrane. The polymer composite comprises a uniform dispersion of hydrophobic polymeric particles in a continuous phase of a hydrophilic polymer. The new method of forming a polymer composite includes the formation of a concentrated emulsion of a hydrophilic monomer and a hydrophobic monomer and heating the concentrated emulsion at a predetermined temperature. The polymer composites of this invention may be useful as permselective membranes.

35 Claims, 4 Drawing Sheets

HYDROPHILIC-HYDROPHOBIC POLYMER COMPOSITES AND MEMBRANES

This is a continuation of application Ser. No. 253,979, filed Oct. 5, 1990, now abandoned.

BACKGROUND OF THE INVENTION

The invention relates in general to polymer composites and more particularly to hydrophilic-hydrophobic polymer composites. The hydrophilic-hydrophobic polymer composites may be prepared using a concentrated emulsion pathway. A polymer composite is a dispersion of particles of one kind of polymer in a continuous phase of another polymer. A Hydrophilic-hydrophobic polymer composite is a polymer composite in which one of the phases is hydrophobic and the other phase is hydrophilic. Polymer composites are of practical importance because their two phase structure often allows for a synergistic behavior regarding their mechanical properties and also for selective permeability to fluids.

Polymers which have a hydrophobic component and a hydrophilic component are known. One method which may be utilized to make hydrophilic-hydrophobic polymers is copolymerization. The copolymers produced include graft copolymers and block copolymers. However, copolymerization results in the formation of polymers which at the molecular level have a hydrophobic and hydrophilic component.

Another method for making hydrophilic-hydrophobic polymer structures is the Interpenetrating Network method. The Interpenetrating Network method is a complex two stage polymerization in which a crosslinked polymer is swelled with a second monomer and with crosslinking and activating agents, and finally subjected to a second polymerization which usually causes the formation of graft copolymers. This method, as its name implies, generally results in interpenetrating networks of two polymers, neither one of which would usually be considered a dispersed phase.

Hydrophilic-hydrophobic polymer composites may be prepared by blending. Blending involves the mixing of two polymers while they are in solution or in a molten, fluid state and often results in the formation of a nonuniform material. This method is especially unsuitable when the desired volume fraction of the dispersed phase is significantly greater than the volume fraction of the continuous phase.

Emulsion polymerization is a process which has been used to make copolymers and homopolymers. Copolymers are formed from at least two different monomers and homopolymers are polymers formed from a single monomer. In conventional emulsion polymerization, monomer droplets are dispersed in an aqueous phase containing micellar aggregates of surfactant. Micellar aggregates as used herein are colloidal particles formed by the reversible aggregation of dissolved molecules. The dispersed phase represents a relatively small volume fraction of the system and the micellar aggregates constitute the sites of the polymerization process. Another method of producing polymers is the concentrated emulsion polymerization method. This method is disclosed in the article, Polymerization in Gel-Like Emulsions, Eli Ruckenstein and Kyu-Jun Kim, Journal of Applied Polymer Science, Vol. 36, 907–923 (1988), the disclosure of which is incorporated by reference herein.

In contrast to conventional emulsion polymerization, in the concentrated emulsion case the volume fraction of the dispersed phase is very high and can be as high a 0.995. The concentrated emulsion has the appearance of a gel and the structure is similar to that of foams. In other words, the dispersed phase consists of polyhedral cells separated by a network of thin liquid films of the continuous phase. The repulsive forces between the surfactant molecules adsorbed on the surfaces of the neighboring cells are responsible for the stability of the gel. In contrast to conventional emulsion polymerization (where the polymerization takes place in the micellar aggregates), the polymerization in a concentrated emulsion takes place in the dispersed phase (which contains the initiator which was introduced before the preparation of the gel). This concentrated emulsion procedure has also been used to produce copolymers.

A useful application of polymers is in the preparation of membranes for various separation processes. However, few polymer blends were developed as permselective membranes, i.e. membranes which allow only some of the liquid components to permeate through the membrane. This is due in part to the generally low compatibility between different polymers which frequently results in nonhomogeneous structures.

One method of preparing permselective membranes is by solvent casting. Solvent casting is a procedure which includes dissolving 2 polymers in a solvent, then evaporating the solvent. However, it is not easy to identify two polymers which are mutually compatible, as a result, the membranes which are obtained by casting also may not be homogeneous. The polymers are particularly incompatible when one of the polymers is very hydrophobic and the other is very hydrophilic. To obtain good permselectivity, it is important that one of the polymers is hydrophobic and the other hydrophilic.

Therefore there still exists a need for a new simple method to produce hydrophobic-hydrophilic composites which will have a uniform structure and may have a wide variety of applications including but not limited to use as a permselective membrane.

SUMMARY OF THE INVENTION

The invention includes a polymer composite, a method for making the polymer composite and a method of making a polymer composite membrane. The polymer composite comprises a dispersion of hydrophobic polymeric particles in a continuous phase of a hydrophilic polymer. The volume fraction of the dispersed phase is greater than the volume fraction of the continuous phase. The method for making the polymer composite comprises the steps of: preparing a concentrated emulsion of a hydrophobic monomer and a hydrophilic monomer wherein the continuous phase contains a surfactant and each of the phases contains an initiator; and heating the system at a predetermined temperature. These polymer composites may be formed as permselective membranes.

It is to be understood that in accordance with the present invention, the hydrophobic/hydrophilic components may be inverted, i.e. the dispersed phase may be hydrophobic when the continuous phase is hydrophilic or the dispersed phase may be hydrophilic when the continuous phase is hydrophobic.

BRIEF DESCRIPTION OF THE DRAWINGS

For a further understanding of the invention as well as its characterizing features, reference should now be made to the following detailed description thereof taken in conjunction with the accompanying drawings, wherein.

DETAILED DESCRIPTION OF THE INVENTION

Figure 1:
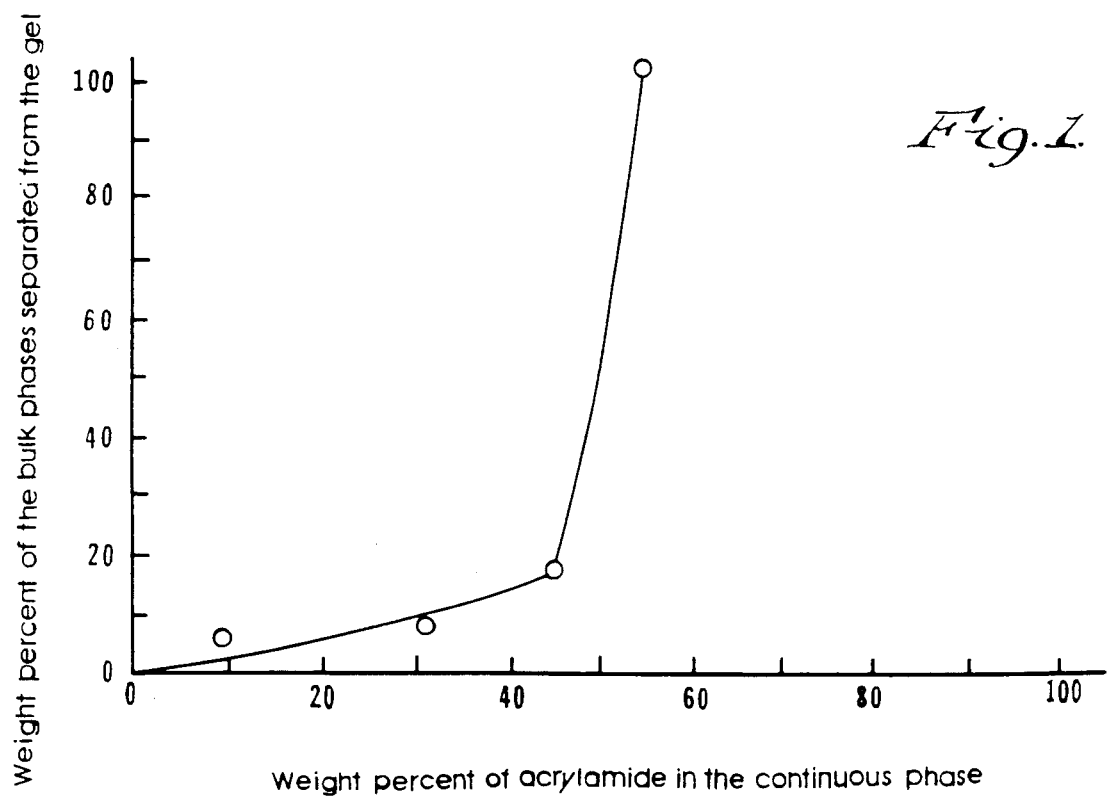
FIG. 1 refers to the stability of the gel and presents the weight percent of the bulk phases separated from the gel by heating, at 40° C. for 22 hours, against the weight percent of acrylamide (black) in the continuous phase when styrene constitutes the dispersed phase (white). The gels were prepared at room temperature. The composition of the gel is that from Table 1 the exception of the amount of acrylamide.

The following terms as used are intended to have the generally accepted meaning in the relevant art. However, they have been briefly defined for convenience.

Polymer as used herein is defined as a macromolecule formed by the union of smaller molecules of the same kind called monomers.

Hydrophobic as used herein is descriptive of having a lack of affinity for water.

Hydrophilic as used herein is descriptive of having an affinity for water.

Aliphatic as used herein pertains to any organic compound of hydrogen and carbon characterized by a straight chain of the carbon atoms.

Volume fraction as used herein is meant the ratio of the volume of a phase to the total volume.

Concentrated Emulsion as used herein is meant a stable dispersion of one liquid in a second immiscible liquid such that the volume fraction of the dispersed phase is greater than about 0.74.

Initiators as used herein are substances that will initiate a chain reaction, as in polymerization.

Surfactants are soluble compounds that reduce the surface tension of liquids, or reduce interfacial tension between two liquids or a liquid and a solid.

Polyhedral as used herein means having multiple sides and surfaces which may be linear or curved or combinations thereof and generally excludes spherical.

Examples of hydrophobic monomers which may be acceptable include, but are not limited to, styrene, methylmethacrylate, d-methylstyrene, 1,3, butadiene, vinyl chloride and vinyl ester and mixtures thereof. The preferred hydrophobic monomers include styrene and methylmethacrylate. Examples of hydrophilic monomers which may be acceptable include but are not limited to acrylamide, vinylacetate, styrene sulfonic acid salt, acrylonitrile, and N-vinyl pyrrolidone and mixtures thereof. A preferred hydrophilic monomer is acrylamide.

The volume fraction of the dispersed phase of the concentrated emulsion is generally greater than 0.74, which represents the volume fraction of the most compact arrangement of spheres. Beyond a volume fraction of 0.74 polyhedral cell structures result which indicates the presence of a concentrated emulsion in accordance with the present invention. The volume fraction of the dispersed phase may be as large as 0.995. Most preferably the volume fraction is between about 0.85 to 0.95.

Appropriate initiators are added to the two phases before the formation of the gel. Initiators which may be appropriate generally have short half lives and should be soluble in the phase in which it is being incorporated. For example, a suitable initiator for the hydrophobic phase includes azo bisisobutyronitrile (AIBN), and a suitable initiator for the hydrophilic phase includes sodium persulfate. The gel may be stabilized by means of an appropriate surfactant. Suitable surfactants should be soluble in the continuous phase and may be selected from the wide variety of surfactants known in the art. Examples of Surfactants which may be used are sodium dodecylsulfate (SDS) or sorbitane monooleate.

Concentrated emulsions have the appearance of gels, and their structure is considered to be similar to that of foams. In other words, the dispersed phase is considered as consisting of polyhedral cells separated by a network of thin liquid films of the continuous phase. An important advantage of the polymerization in concentrated emulsion is that the size of the cell (the dispersed phase) is preserved throughout polymerization so that the morphology can be manipulated by adopting appropriate conditions during gel formation. The repulsive forces between the surfactant molecules adsorbed on the surfaces of the neighboring cells are responsible for the stability of the gel.

The concentrated emulsions can be obtained by placing a small amount of at least one hydrophilic monomer, containing surfactant and initiator in a flask and slowly adding at least one hydrophobic monomer containing the initiator to the hydrophilic monomer while stirring. Phase separation should be prevented by adjusting the temperature and the amount of surfactant.

The concentrated emulsions are more stable when one of the phases is sufficiently hydrophobic and the other phase is sufficiently hydrophilic. In order to increase the hydrophobicity and hydrophilicity of the continuous or dispersed phases, and hence the stability of the gel, solutions of the hydrophobic monomer in a higher aliphatic, as well as solutions of the hydrophilic monomer in water may be employed. By higher aliphatics is meant an aliphatic having at least 6 carbon atoms. Suitable higher aliphatics include hexane and decane.

After formation of the gel at room temperature, the system is heated to an appropriate predetermined temperature at which polymerization takes place and the gel remains stable. Temperatures between about 30° C. to about 70° C. and preferably about 40° C. may be appropriate.

Either composites in which the dispersed phase is hydrophilic and the continuous phase hydrophobic or the dispersed phase is hydrophobic and the continuous phase hydrophilic can be obtained. In either case, a uniform hydrophilic-hydrophobic composite is obtained whose properties combine the above two contrary characteristics. This affects the mechanical properties of the composite, but also its permeability to different compounds. It is also contemplated that more than one monomer may be in one phase. For example, a polymer composite having a copolymer in one or both phases is not outside the scope of this invention.

The following examples and preparations describe the manner and process of making and using the invention and set forth the best mode contemplated by the inventors of carrying out the invention, but are not to be construed as limiting.

EXAMPLE I

Preparation of a polystyrene (dispersed phase)—polyacrylamide (continuous phase) composite The quantities and materials involved are listed hereunder in Table 1:

TABLE 1

Amounts of Components Used in the Preparation of the Polystyrene-Polyacrylamide Polymer Composite

| The dispersed phase | |
|---|---|
| styrene | 27 g |
| initiator (AIBN) | $2.0 \times 10^{-4}$ g/g of styrene |
| The continuous phase | |
| acrylamide | 1.0 g |
| water | 4 mL |
| initiator (sodium persulfate) | $1.7 \times 10^{-4}$ g/g of acrylamide |
| surfactant (sodium dodecylsulfate, SDS) | 0.3 g |

The aqueous solution of acrylamide (obtained from Polysciences Co. and recrystallized from methanol), containing SDS (sodium dodecylsulfate, obtained from the Aldrich Chemical Co.), was placed in a three-neck flask (250ml capacity) equipped with a mechanical stirrer, an addition funnel, and a nitrogen inlet.

Styrene (obtained from the Aldrich Chemical Co. and distilled and stored in a conventional refrigerator) containing AIBN (azo bisisobutyronitrile, obtained from the Alfa Chemical Co. and recrystallized from methanol) was placed in the addition funnel. Prior to polymerization, oxygen was removed from the organic and aqueous phases by nitrogen bubbling for 20 minutes. Then, potassium persulfate solution (obtained from the Aldrich Chemical Co. and recrystallized from distilled water) in water (the water was deionized and distilled) deoxygenated by nitrogen bubbling was injected with a syringe into the aqueous solution of acrylamide present in the flask. The preparation of the concentrated emulsion was carried out by dropwise addition of styrene containing AIBN to the stirred aqueous solution containing acrylamide, surfactant and potassium persulfate. The polymerization was carried out in a water bath, at 40° C., under a nitrogen stream.

The stability of the concentrated emulsion or gel was analyzed without the polymerization previously discussed. The weight percent of bulk liquids (phases) which separated from the gel by the coalesence of some cells after heating the gel at 40° C. for 22 hours is plotted in FIG. 1 against the weight percent of acrylamide in water. (Note: that the stability experiments have been carried in the absence of the initiators). The weight percent of the bulk liquids separated increases as the concentration of acrylamide increases, and the gel becomes completely unstable when the amount of acrylamide exceeds about 50%. There is no gel formation even at room temperature when the amount of acrylamide is greater than this value. The loss of hydrophilicity caused by the increase in the amount of acrylamide accounts for the destabilization of the gel at the higher weight fractions of the latter monomer. In Table 2 hereunder the percentages of bulk phases separated from the gel at two different temperatures are compared to show that at the higher temperature and higher content of acrylamide the amount separated is greater.

TABLE 2

| Compositions | Temp. (°C.) | Oil Phase (%)[a] | Aqueous Phase (%)[b] |
|---|---|---|---|
| Continuous Phase: 0.5 g acrylamide, 4 mL water | 40 | 4.3 | 1.1 |
| Dispersed Phase: 30 mL styrene | 50 | 14.0 | 59 |
| Continuous Phase: 1 g acrylamide, 4 mL water | 40 | 11.8 | 1.4 |
| Dispersed Phase: 30 mL styrene | 50 | 14.5 | 66.7 |

[a]Weight percent of oil phase which separated with respect to the total amount of oil phase
[b]Weight percent of aqueous phase separated with respect to the total amount of aqueous phase.

The morphology of the polymer composites was examined by employing transmission electron microscopy. The following procedure was used to prepare the specimens. The polymer samples were cooled to −120° C. and sectioned by an ultramicrotome (Reichert-Jung Ultracut 43-E, manufactured by Cambridge Instruments) which is equipped with a FC-4D cryoul ultramicrotomy stage. The thin sections (ca. 900Å) thus obtained were mounted on copper grids and shadowed with carbon in a vacuum evaporator. The sample grids were dried under vacuum overnight, before electron micrographs with a transmission electron microscope (Hitachi HS-8, Hitachi Instruments) were taken.

Figure 2:
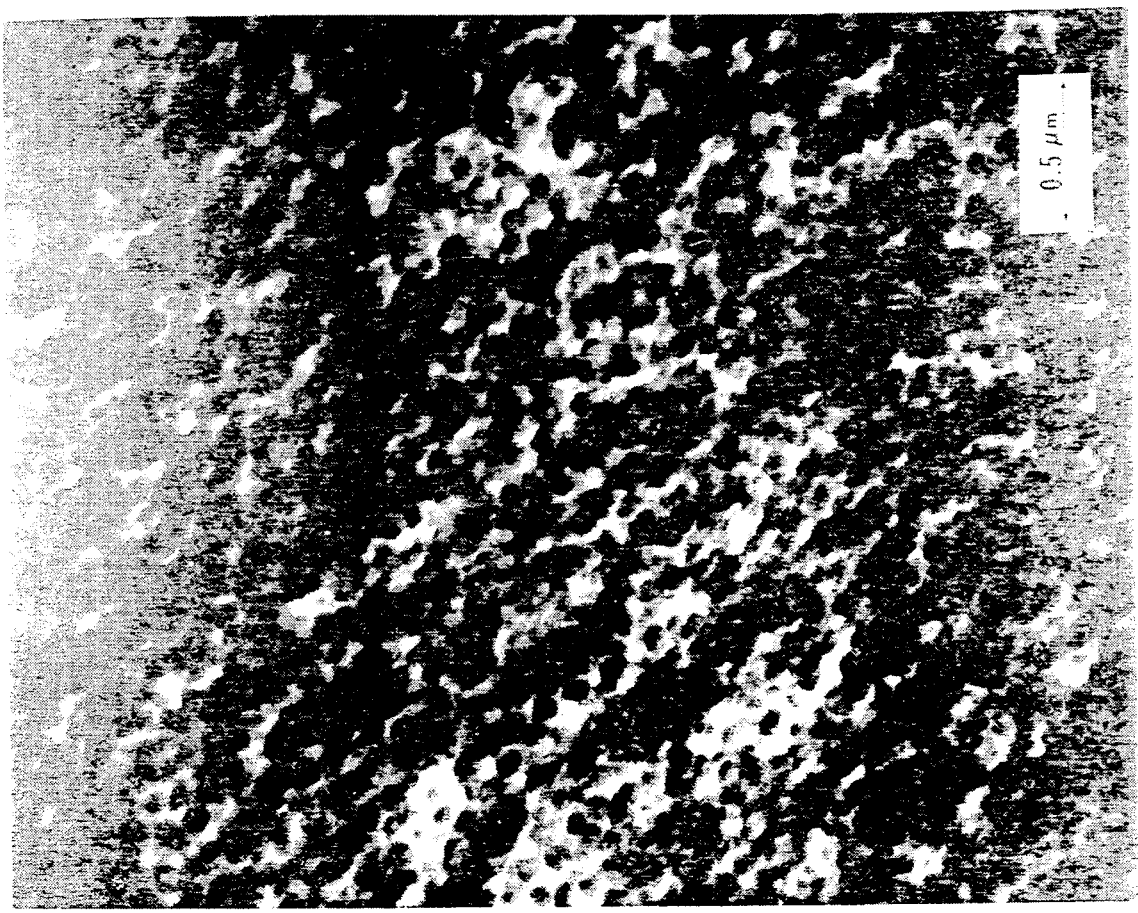
FIG. 2 is a transmission electron micrograph of a composite with the composition given in Table 1. The white regions represent the styrene and the black, the acrylamide.

A transmission electron micrograph of a composite whose composition is given in Table 1 is presented in FIG. 2. Polystyrene particles can be detected which are nearly spherical and are separated by polyacrylamide films. The obtained material has the appearance of a light blue solid. (This should be contrasted with the soft and elastic characteristics of the polyacrylamide-polystyrene composite, when the polyacrylamide constitutes the dispersed phase as discussed below.)

EXAMPLE II

Preparation of polyacrylamide (dispersed phase)—polystyrene (continuous phase) composite The quantities and materials involved are listed in Table 3 hereunder:

TABLE 3

Amounts of Components Used in the Preparation of the Polyacrylamide-Polystyrene Polymer Composite

| The dispersed phase | |
|---|---|
| 12 g acrylamide and 28 g water | |
| initiator (sodium persulfate) | $1.7 \times 10^{-4}$ g/g of acrylamide |
| The continuous phase | |
| styrene | 2.5 g |
| initiator (AIBN) | $2.0 \times 10^{-4}$ g/g of styrene |
| decane | 2 mL |
| surfactant (sorbitane monooleate) | 1 mL |

Decane (obtained from the Fluka Chemical Co.), sorbitane monooleate (Span 80, obtained from the Fluka Chemical Co.), AIBN, and styrene were placed in a three-neck flask (250 ml capacity) equipped with a mechanical stirrer, an addition funnel, and a nitrogen inlet.

The acrylamide was dissolved in water and placed in the addition funnel. Prior to polymerization, oxygen was removed from the organic and aqueous phases by nitrogen bubbling for 20 minutes. A deoxygenated (by nitrogen bubbling) solution of potassium persulfate was injected with a syringe into the aqueous solution of acrylamide present in the addition funnel. The preparation of the concentrated emulsion was carried out by dropwise addition of the aqueous solution of acrylamide to the stirred mixture of styrene, decane, AIBN, and surfactant. The preparation of the concentrated emulsion lasted about 10 minutes, and was performed at room temperature. The polymerization was carried out in a water bath at 40° C. under a nitrogen stream.

Figure 3:
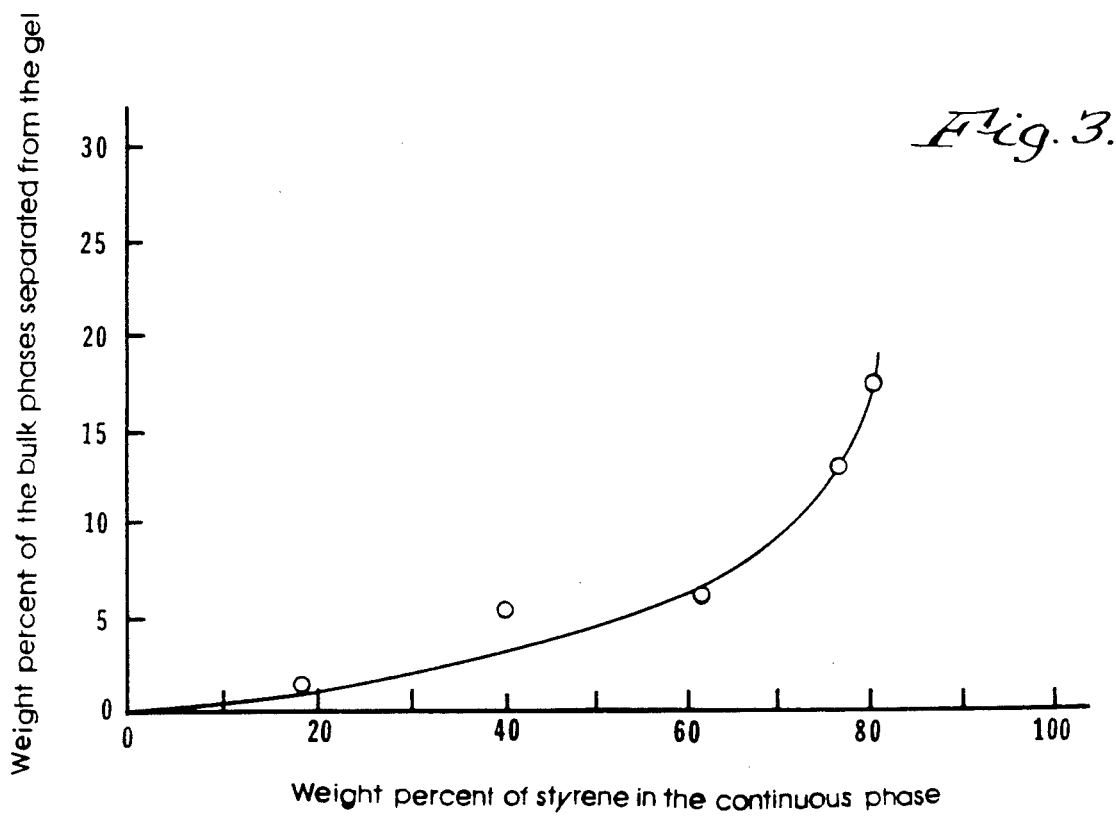
FIG. 3 refers to the stability of the gel and presents the weight percent of the bulk phases separated from the gel by heating, at 40° C. for 24 hours, against the weight percent of styrene in decane in the continuous phase. The gels were prepared at room temperature. The composition of the gel is that from Table 3 with the exception of the amount of styrene.

The gel stability was analyzed as in Example I. The effect of the amount of styrene present in the continuous phase on the stability of the gel was examined first. In FIG. 3, the weight fraction separated from the gel as bulk liquids after heating at 40° C. for 24 hours is plotted against the weight fraction of styrene in the continuous phase. (Note that the initiators have not been introduced into the phases.) The gel remains stable until the weight fraction of styrene in the continuous phase reaches about 60%. The stability of the gel decreases very rapidly beyond this value. This occurs because styrene is not sufficiently hydrophobic. Table 4 hereunder lists the weight percent of oil and aqueous phases that separate on heating at 40° C. and 50° C.

TABLE 4

| Compositions | Temp. (°C.) | Oil Phase (%)[a] | Aqueous Phase (%)[b] |
|---|---|---|---|
| Continuous Phase: 2 g styrene, 2 mL decane 1 mL sorbitane monooleate | 40 | 1.8 | 1.3 |
| Dispersed Phase: 12 g acrylamide, 28 g water | 50 | 12.0 | 19.8 |
| Continuous Phase: 5 g styrene, 2 mL decane 1 mL sorbitane monooleate | 40 | 1.4 | 1.5 |
| Dispersed Phase: 12 g acrylamide, 28 g water | 50 | 15.0 | 30.3 |

[a]Weight percent of oil phase which separated after heating with respect to the total amount of oil phase (decane, surfactant, styrene)
[b]Weight percent of aqueous phase separated with respect to the total amount of aqueous phase.

It was determined that the gels became more unstable at higher temperature and broke more easily as the percentage of styrene (continuous phase) was increased.

Figure 4:
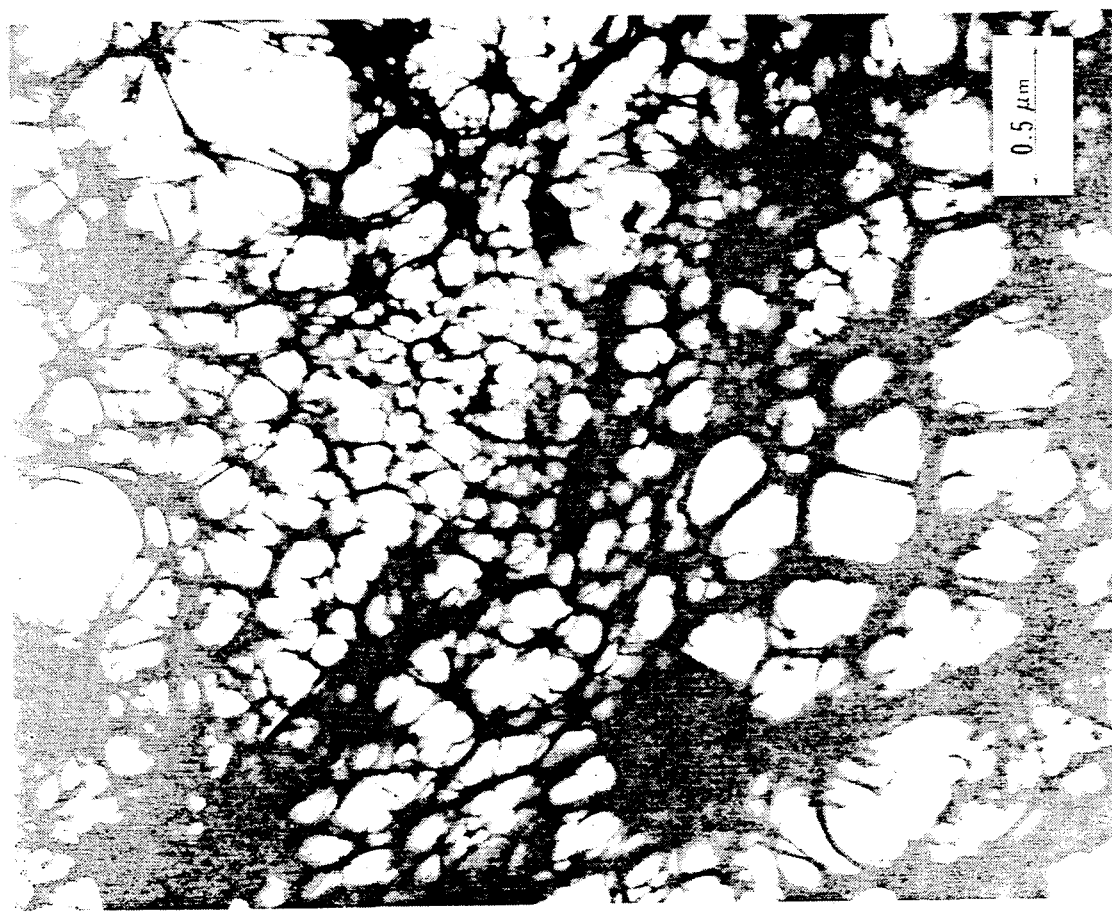
FIG. 4 shows a transmission electron micrograph of a composite with the composition given in Table 3. The white regions represent the polyacrylamide and the black, the polystyrene.

An electron microscopy investigation was performed in a similar manner to that described above for the polystyrene (dispersed phase)-polyacrylamide (continuous phase) composite. A transmission electron micrograph of a composite whose composition is given in Table 2 is presented in FIG. 4. This figure illustrates that the dispersed phase is composed of polyhedral cells of polyacrylamide separated by films of polystyrene. The obtained material is white, soft and exhibits some elasticity.

EXAMPLE III

Preparation of a Permselective Membrane

The concentrated emulsion polymerization method was employed to prepare a new kind of permselective membrane, the hydrophilic-hydrophobic polymer composite membrane. Although a wide range of polymer membranes composed of a variety of polymer combinations can be produced in accordance with this invention, two specific examples will be discussed herebelow.

One of the polymers should be selected so that it is soluble in the liquid component for which the membrane should be permselective. The second polymer should be insoluble in all of the liquid components. Thus, the dissolution of the highly soluble polymer can be prevented by its entanglement with the other polymer.

Toluene is a good solvent for polystyrene and a poor solvent for polyacrylamide; cyclohexane is a very poor solvent for both polystyrene and polyacrylamide. It is therefore expected that a composite containing polystyrene as the dispersed phase and polyacrylamide as the continuous phase will swell by selectively absorbing toluene. Experiments were carried out by immersing small cylinders of polystyrene (dispersed)-polyacrylamide (continuous) composites in solvents at 20° C. The amounts sorbed at equilibrium per gram of polymer were 14.86 g toluene/g polymer and 1.03 g cyclohexane/g polymer.

As a result, the hydrophobic-hydrophilic composite of polystyrene (dispersed phase) and polyacrylamide (continuous phase) prepared as a membrane would be expected to be highly permeable to aromatic hydrocarbons and impermeable to aliphatic and this was confirmed by further experiments. Experiments carried out have lead to selectivities in the range of about 4 to about 8. The selectivity, $\alpha_{T,C}$ may be defined by $$\alpha_{T,C} = \frac{X_T^P X_C^F}{X_T^F X_C^P}$$

where $X_T^F X_C^F$, $X_T^P$, $X_C^P$ denote the weight fractions of the components T and C in the feed and permeate respectively.

Depending upon the concentration of the feed, the permeation rate through the membrane is in the range of about $2 \times 10^3$ to about $1 \times 10^4$ g/m$^2$hr.

The membranes may be prepared in a variety of shapes, including tubes. One method of preparing the membrane is as follows. First, the concentrated emulsion is prepared as described supra. Similar amounts of the components as in Table 1 supra may be utilized. Next, two glass plates (10 cm × 15 cm) are prepared by cleaning with detergent and drying at 140° C. for 4 hours. A small amount of glycerol or other suitable material may be placed on the surfaces of the glass plates as lubricant. The concentrated emulsion may be set between the two glass plates and squeezed slowly to avoid trapping of air bubbles in the membrane. For polymerization to occur, the glass plates containing the gel between them may be placed in a temperature controlled oven at 50° C. for 24 hours. The membranes were kept at room temperature for three days for drying purposes. The membranes can range in size from 100 to 1000 μm and may preferably be about 600 μm thick.

Membranes in which the continuous phase is hydrophobic and the dispersed phase is hydrophilic show selectivity in the absorption and permeation of a mixture of alcohol (for example ethanol) and water. Desired permeation behavior may be obtained by varying certain factors such as the ratio of the polymers in the composite. In the experiments, the dispersed phase was acrylamide and the continuous phase was a mixture of styrene and divinylbenzene. The equilibrium absorption was 4 g water/g polymer and no significant amount of alcohol is absorbed. The selectivity for permeation varied between about 3 and about 55 increasing with the ethanol concentration. The permeability varied between about 60 to about 900 g/m$^2$hr.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

What is claimed is:

1. A method for making a hydrophilic-hydrophobic polymer composite comprising a dispersion of particles of one kind of polymer in a continuous phase of another polymer, which comprises the steps of:
   a. forming a concentrated emulsion of a hydrophobic monomer and a hydrophilic monomer, the continuous phase of said concentrated emulsion comprising a surfactant and an initiator and the dispersed phase comprising an initiator, wherein the volume fraction of the dispersed phase is greater than about 0.74; and
   b. heating said concentrated emulsion at a predetermined temperature.

2. The method as recited in claim 1 wherein the hydrophobic monomer is a component of the continuous phase and the hydrophilic monomer is a component of the dispersed phase of the concentrated emulsion.

3. The method as recited in claim 1 wherein the hydrophobic monomer is a component of the continuous phase and the hydrophobic monomer is a component of a dispersed phase of the concentrated emulsion.

4. The method as recited in claim 1 wherein the hydrophobic monomer is selected from the group consisting of styrene, methylmethacrylate, d-methylstyrene, 1,3-butadiene, vinyl chloride and vinyl ester.

5. The method as recited in claim 1 wherein the hydrophobic monomer is styrene.

6. The method as recited in claim 2 wherein the hydrophobic monomer is styrene.

7. The method as recited in claim 5 wherein the hydrophobic monomer is styrene.

8. The method as recited in claim 1 wherein the hydrophilic monomer is selected from the group consisting of acrylamide, vinylacetate, styrene sulfonic acid salt, acrylonitrile, and N-vinylpyrrolidone.

9. The method as recited in claim 1 wherein the hydrophilic monomer is acrylamide.

10. The method as recited in claim 2 wherein the hydrophilic monomer is acrylamide.

11. The method as recited in claim 3 wherein the hydrophilic monomer is acrylamide.

12. The method as recited in claim 5 wherein the hydrophilic monomer is acrylamide.

13. The method as recited in claim 1 wherein the volume fraction of the dispersed phase is greater than about 0.74 up to about 0.995.

14. The method as recited in claim 18 wherein the volume fraction of the dispersed phase is greater than about 0.74.

15. The method as recited in claim wherein the volume fraction of the dispersed phase is about 0.85 up to about 0.95.

16. The method as recited in claim 1 wherein the surfactant is sodium dodecylsulfate.

17. The method as recited in claim 12 wherein the surfactant is sodium dodecylsulfate.

18. The method as recited in claim 1 wherein the hydrophobic monomer is dissolved in a solution of a higher aliphatic hydrocarbon.

19. The method as recited in claim 12 wherein the hydrophobic monomer is dissolved in a solution of a higher aliphatic hydrocarbon.

20. The method as recited in claim 17 wherein the hydrophobic monomer is dissolved in a solution of a higher aliphatic hydrocarbon.

21. The method as recited in claim 18 wherein the higher aliphatic hydrocarbon is an aliphatic having at least 6 carbon atoms.

22. The method as recited in claim 13 wherein the higher aliphatic hydrocarbon is decane.

23. The method as recited in claim 1 wherein the hydrophilic monomer is dissolved in a solution of water.

24. The method as recited in claim 12 wherein the hydrophilic monomer is dissolved in a solution of water.

25. The method as recited in claim 17 wherein the hydrophilic monomer is dissolved in a solution of water.

26. The method as recited in claim 21 wherein the hydrophilic monomer is dissolved in a solution of water.

27. The method as recited in claim 1 wherein the initiators are AIBN and sodium persulfate.

28. The method as recited in claim 17 wherein the initiators are AIBN and sodium persulfate.

29. The method as recited in claim 21 wherein the initiators are AIBN and sodium persulfate.

30. The method as recited in claim 1 wherein the heating is at a temperature of between about 30° C. to about 70° C.

31. The method as recited in claim 29 wherein the heating is at a temperature of between about 30° C. to about 70° C.

32. The method as recited in claim 1 wherein the heating is at a temperature of about 40° C.

33. The method as recited in claim 1 wherein the heating is at a temperature of about 40° C.

34. The method as recited in claim 1 wherein the concentrated emulsion is prepared at about room temperature.

35. The method of making a permselective polymer composite membrane comprising the steps of:
   a. forming a concentrated emulsion of a hydrophobic monomer and a hydrophilic monomer, the continuous phase of said concentrated emulsion comprising a surfactant and an initiator and the dispersed phase comprising an initiator wherein the volume fraction of the dispersed phase is greater than about 0.74;
   b. forming a thin layer of the concentrated emulsion; and
   c. heating the thin layer at a predetermined temperature.

* * * * *